(12) United States Patent
Anderson

(10) Patent No.: US 10,575,678 B1
(45) Date of Patent: Mar. 3, 2020

(54) KIT FOR BAKING SANDWICH BUNS

(71) Applicant: Elliot Anderson, Seward, AK (US)

(72) Inventor: Elliot Anderson, Seward, AK (US)

(*) Notice: Subject to any disclaimer, the term of this patent is extended or adjusted under 35 U.S.C. 154(b) by 0 days.

(21) Appl. No.: 15/434,733

(22) Filed: Feb. 16, 2017

(51) Int. Cl.
*A47J 37/01* (2006.01)
*A47J 36/02* (2006.01)

(52) U.S. Cl.
CPC .............. *A47J 37/01* (2013.01); *A47J 36/02* (2013.01)

(58) Field of Classification Search
CPC .. A47J 37/01; A47J 36/02; A21B 5/02; A21B 5/026; A21B 5/04; A21B 3/13; A21B 3/132; A21B 3/133; A21B 3/134; A21B 3/135
USPC ...................................................... 220/573.5
See application file for complete search history.

(56) References Cited

U.S. PATENT DOCUMENTS

| | | | | |
|---|---|---|---|---|
| 1,510,279 A | * | 9/1924 | Huth ...................... | A21B 3/132 249/DIG. 1 |
| 1,543,221 A | * | 6/1925 | Matson .................. | A21B 5/023 99/383 |
| 1,627,757 A | * | 5/1927 | Von Elm .................. | A21B 3/13 220/506 |
| 1,628,885 A | * | 5/1927 | Jackson ................. | A21B 3/134 220/23.2 |
| 1,740,999 A | * | 12/1929 | Prabell .................. | A21B 3/134 220/23.2 |
| 1,831,147 A | * | 11/1931 | Smith ..................... | A21B 3/132 99/439 |
| 2,529,354 A | * | 11/1950 | Schroeder ................ | A21B 3/13 220/506 |
| 3,015,287 A | * | 1/1962 | Noel ...................... | A21B 3/135 198/803.11 |
| 3,339,878 A | * | 9/1967 | Lind ...................... | A21B 3/134 249/121 |
| 3,520,438 A | * | 7/1970 | Apelgren ............... | A21B 3/134 220/23.2 |
| 3,831,507 A | * | 8/1974 | Wheaton ................. | A21B 3/13 99/383 |
| 4,296,682 A | * | 10/1981 | Thompson ............. | A21B 3/135 220/23.2 |
| 4,371,327 A | * | 2/1983 | Fievez ................. | A21C 11/006 249/119 |
| 4,812,323 A | * | 3/1989 | Savage .................. | A21D 13/33 249/122 |
| D301,427 S | * | 6/1989 | Klingelhofer ................. | D7/508 |
| 5,191,830 A | * | 3/1993 | Jacobson ............... | A21B 3/132 249/120 |
| 5,226,352 A | * | 7/1993 | Savage .................... | A21B 3/13 249/144 |
| 5,400,698 A | * | 3/1995 | Savage .................... | A21B 3/13 249/144 |

(Continued)

*Primary Examiner* — Ernesto A Grano

(57) ABSTRACT

A kit for baking sandwich buns including a heat-resistant bottom baking pan having a plurality of recessed cylindrical bottom chambers. One of a plurality of cylindrical bowls is removably disposable within one of the plurality of recessed cylindrical bottom chambers of the heat-resistant bottom baking pan. A heat-resistant top baking pan has a plurality of recessed cylindrical top chambers. The heat-resistant top baking pan is removably disposed atop the heat-resistant bottom baking pan so that one of the plurality of recessed cylindrical top chambers of the heat-resistant top baking pan is disposed atop one of the plurality of recessed cylindrical bottom chambers of the heat-resistant bottom baking pan.

3 Claims, 5 Drawing Sheets

(56) References Cited

U.S. PATENT DOCUMENTS

| | | | | |
|---|---|---|---|---|
| 5,425,527 A * | 6/1995 | Selbak | A21B 3/132 | 249/120 |
| 5,601,012 A * | 2/1997 | Ellner | A21B 3/133 | 249/120 |
| 5,974,934 A | 11/1999 | Woods | | |
| D481,905 S * | 11/2003 | Nolan | | 220/507 |
| 6,840,162 B2 | 1/2005 | Morgan | | |
| 6,869,059 B2 * | 3/2005 | Sloan | A21B 3/132 | 220/573.1 |
| 6,973,872 B2 * | 12/2005 | Morgan | A21B 3/13 | 99/428 |
| 7,150,221 B2 * | 12/2006 | Morgan | A21B 3/13 | 99/428 |
| 7,431,174 B2 * | 10/2008 | Thissen | A47J 41/0044 | 220/574.2 |
| 7,997,439 B2 * | 8/2011 | Meeks | A21B 3/136 | 220/573.2 |
| 8,092,849 B2 * | 1/2012 | Kane | A21B 3/133 | 426/280 |
| 8,109,203 B1 * | 2/2012 | Rivera | A47J 43/20 | 425/193 |
| D661,541 S * | 6/2012 | Braden | | D7/354 |
| 8,499,684 B1 * | 8/2013 | Premraj | A21C 11/00 | 249/122 |
| 8,802,176 B2 * | 8/2014 | Lange | A47J 36/00 | 426/138 |
| D749,890 S * | 2/2016 | Person | | D7/354 |
| 9,474,411 B2 * | 10/2016 | Gattineri | | A47J 37/01 |
| 9,764,503 B2 * | 9/2017 | Seto | | B29C 43/52 |
| 9,801,389 B2 * | 10/2017 | Hauser | | A21B 3/132 |
| 2003/0047838 A1 * | 3/2003 | Beale | A21B 3/131 | 264/328.1 |
| 2008/0314259 A1 * | 12/2008 | Broom | A21B 3/132 | 99/426 |
| 2010/0260909 A1 * | 10/2010 | McPheron | A21B 3/13 | 426/523 |
| 2012/0003363 A1 * | 1/2012 | Beloff | A21B 5/026 | 426/138 |
| 2013/0189410 A1 * | 7/2013 | Braden | A21B 3/132 | 426/280 |
| 2013/0209631 A1 * | 8/2013 | Connell | A21B 3/132 | 426/282 |
| 2013/0341335 A1 * | 12/2013 | Sitabkhan | A47J 27/002 | 220/573.5 |
| 2014/0141151 A1 * | 5/2014 | Wirth | A21B 3/131 | 426/653 |
| 2014/0272022 A1 * | 9/2014 | Acampora | A21B 3/132 | 426/134 |
| 2015/0034664 A1 * | 2/2015 | Baecher | A21B 3/135 | 220/780 |
| 2015/0201802 A1 * | 7/2015 | Moore | A47J 36/16 | 426/389 |
| 2015/0258717 A1 * | 9/2015 | Seto | A21B 3/13 | 425/404 |
| 2015/0359384 A1 * | 12/2015 | Garbrick | A47J 37/01 | 426/420 |
| 2016/0157671 A1 * | 6/2016 | Fishel | A47J 36/022 | 220/573.2 |
| 2017/0095113 A1 * | 4/2017 | Cox | | A47J 37/01 |
| 2017/0188595 A1 * | 7/2017 | Mayernick | | A21D 13/32 |
| 2017/0367352 A1 * | 12/2017 | Owens | | A21B 3/137 |

* cited by examiner

KIT FOR BAKING SANDWICH BUNS

BACKGROUND OF THE INVENTION

Various types of baking molds are known in the prior art. However, what has been needed is a kit for baking sandwich buns including a heat-resistant bottom baking pan having a plurality of recessed cylindrical bottom chambers and one of a plurality of cylindrical bowls removably disposable within one of the plurality of recessed cylindrical bottom chambers of the heat-resistant bottom baking pan. What has been further needed is a heat-resistant top baking pan having a plurality of recessed cylindrical top chambers. Lastly, what has been needed is for the heat-resistant top baking pan to be removably disposed atop the heat-resistant bottom baking pan so that one of the plurality of recessed cylindrical top chambers of the heat-resistant top baking pan is disposed atop one of the plurality of recessed cylindrical bottom chambers of the heat-resistant bottom baking pan. The kit for baking sandwich buns thus allows a user to create a sandwich bun in the shape of a bowl using one of the cylindrical bowls disposed within one of the recessed cylindrical bottom chambers of the bottom baking pan. The bowl-shaped sandwich bun helps to preserve the structure of the sandwich and maintain the filling within the bun while a user eats the sandwich.

FIELD OF THE INVENTION

The present invention relates to baking molds, and more particularly, to a kit for baking sandwich buns.

SUMMARY OF THE INVENTION

The general purpose of the present kit for baking sandwich buns, described subsequently in greater detail, is to provide a kit for baking sandwich buns which has many novel features that result in a kit for baking sandwich buns which is not anticipated, rendered obvious, suggested, or even implied by prior art, either alone or in combination thereof.

To accomplish this, the present kit for baking sandwich buns includes a heat-resistant bottom baking pan, optionally a metal, having a plurality of recessed cylindrical bottom chambers. Each of a plurality of cylindrical bowls has a circumference less than a circumference of each of the plurality of recessed cylindrical bottom chambers of the heat-resistant bottom baking pan. One of the plurality of cylindrical bowls is removably disposable within one of the plurality of recessed cylindrical bottom chambers of the heat-resistant bottom baking pan.

The kit for baking sandwich buns further includes a heat-resistant top baking pan, optionally a metal, having a plurality of recessed cylindrical top chambers. A circumference of each of the plurality of recessed cylindrical top chambers is approximately equal to the circumference of each of the plurality of recessed cylindrical bottom chambers of the heat-resistant bottom baking pan, and the plurality of recessed cylindrical bottom chambers of the heat-resistant bottom baking pan is equal to the plurality of recessed cylindrical top chambers of the heat-resistant top baking pan. The plurality of recessed cylindrical bottom chambers of the heat-resistant bottom baking pan is optionally twelve. The heat-resistant top baking pan is removably disposed atop the heat-resistant bottom baking pan so that one of the plurality of recessed cylindrical top chambers of the heat-resistant top baking pan is disposed atop one of the plurality of recessed cylindrical bottom chambers of the heat-resistant bottom baking pan.

Thus has been broadly outlined the more important features of the present kit for baking sandwich buns so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
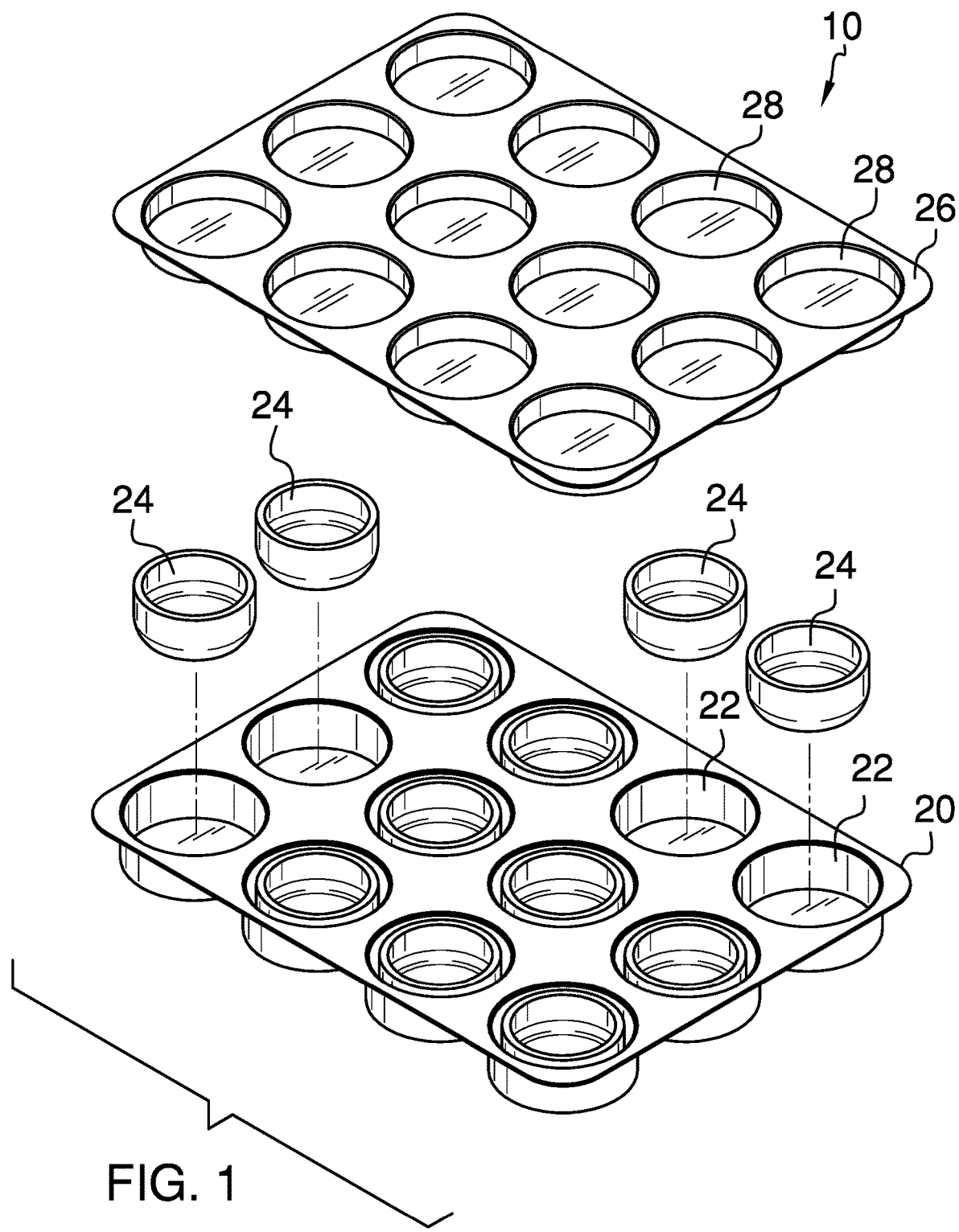
FIG. 1 is a front isometric view.
Figure 2:
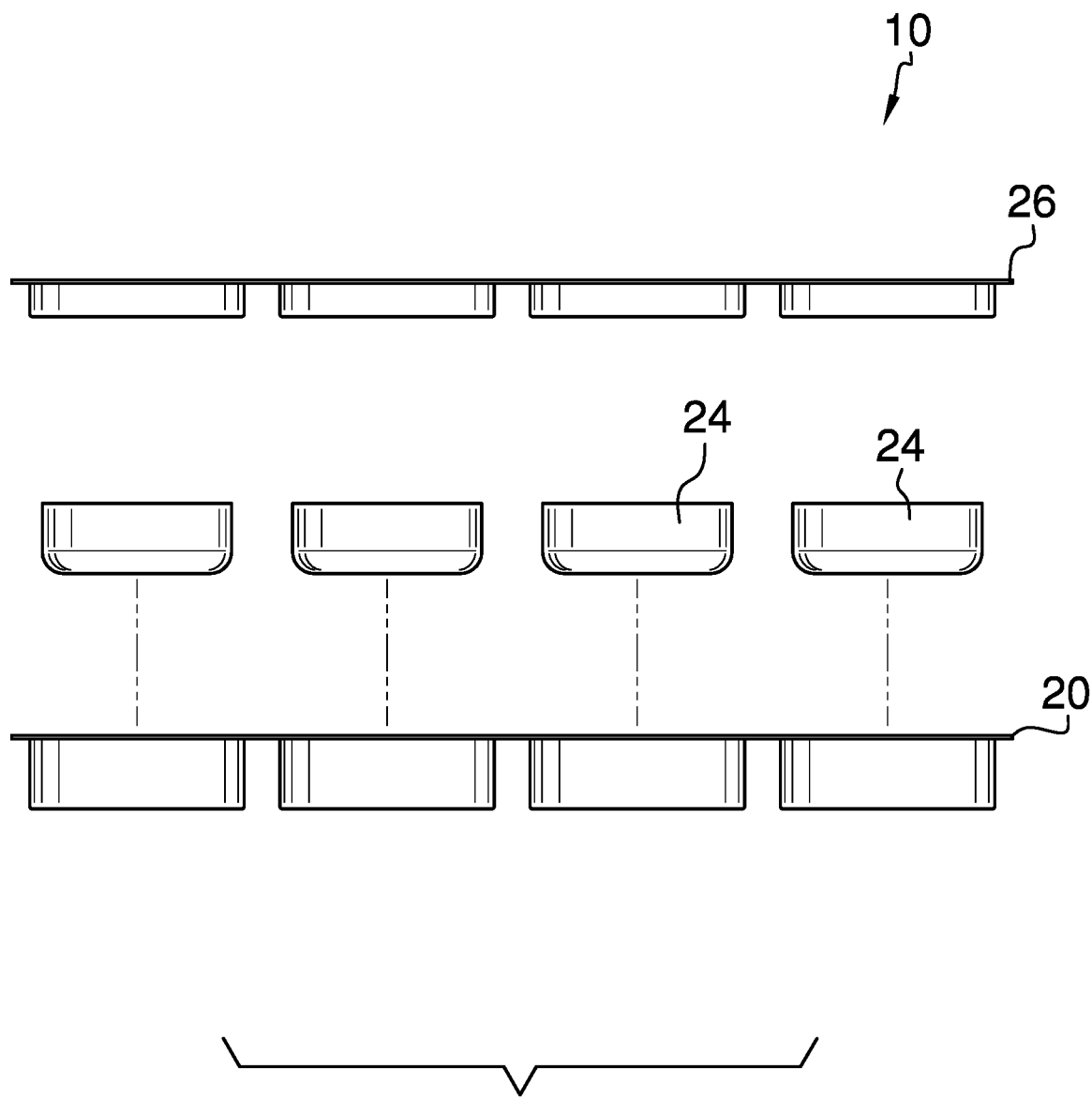
FIG. 2 is a side elevation view.
Figure 3:
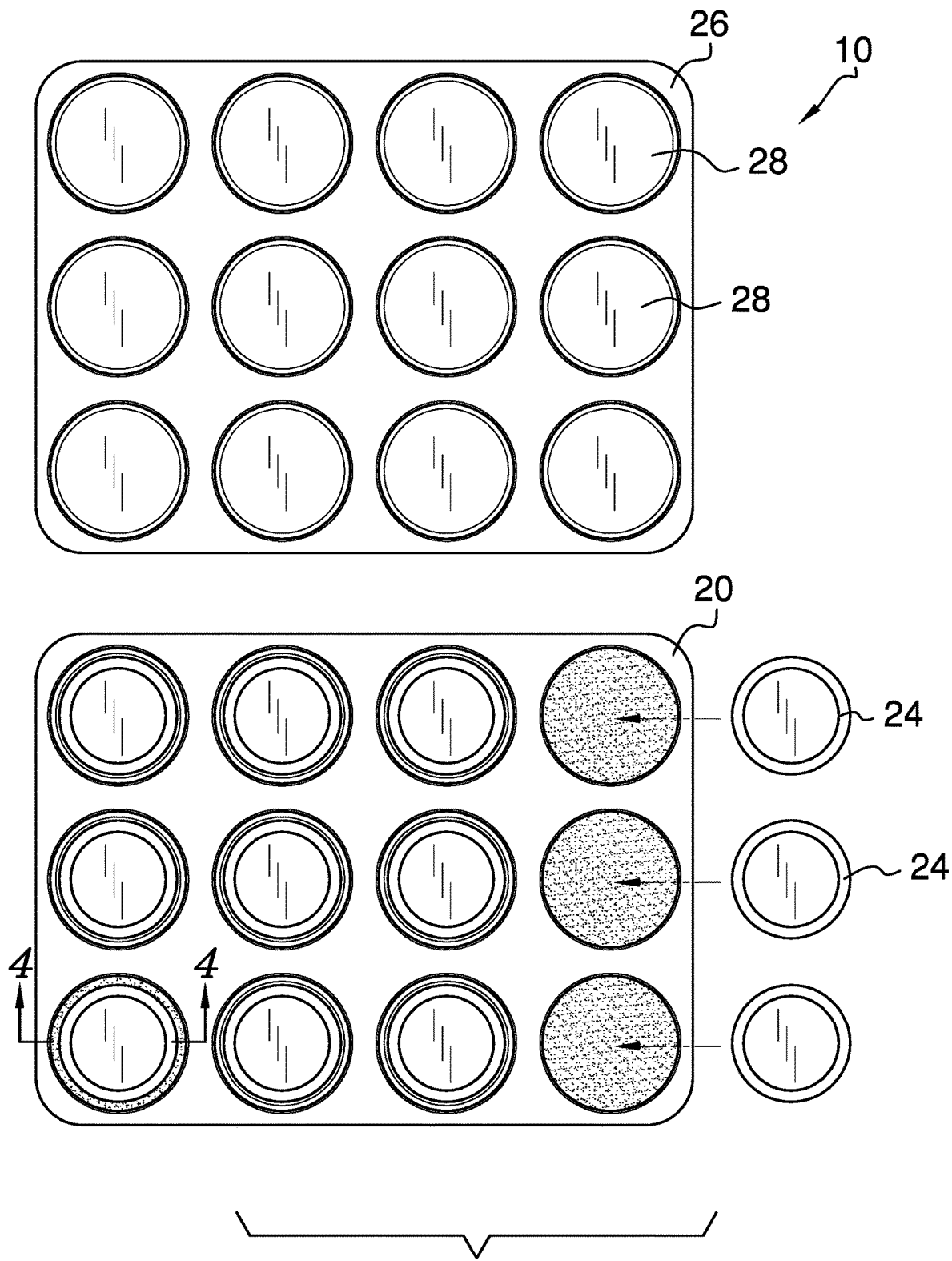
FIG. 3 is a top plan view.
Figure 4:
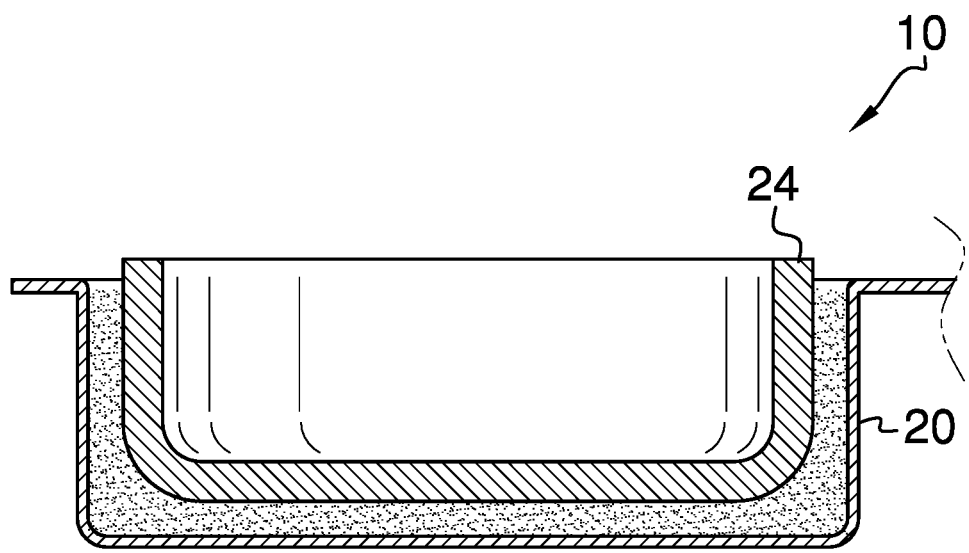
FIG. 4 is a cross-sectional view taken along line 4-4 of FIG. 3.
Figure 5:
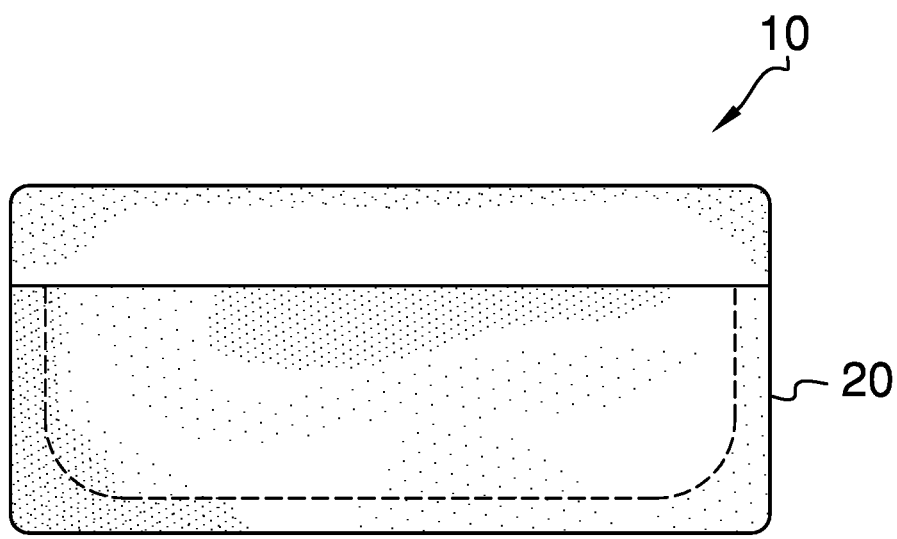
FIG. 5 is a detail view.

With reference now to the drawings, and in particular FIGS. 1 through 6 thereof, an example of the instant kit for baking sandwich buns employing the principles and concepts of the present kit for baking sandwich buns and generally designated by the reference number 10 will be described.

Referring to FIGS. 1 through 6 the present kit for baking sandwich buns 10 is illustrated. The kit for baking sandwich buns 10 includes a heat-resistant bottom baking pan 20, optionally a metal, having a plurality of recessed cylindrical bottom chambers 22. Each of a plurality of cylindrical bowls 24 has a circumference less than a circumference of each of the plurality of recessed cylindrical bottom chambers 22 of the heat-resistant bottom baking pan 20. One of the plurality of cylindrical bowls 24 is removably disposable within one of the plurality of recessed cylindrical bottom chambers 22 of the heat-resistant bottom baking pan 20.

The kit for baking sandwich buns 10 further includes a heat-resistant top baking pan 26, optionally a metal, having a plurality of recessed cylindrical top chambers 28. A circumference of each of the plurality of recessed cylindrical top chambers 28 is approximately equal to the circumference of each of the plurality of recessed cylindrical bottom chambers 22 of the heat-resistant bottom baking pan 20, and the plurality of recessed cylindrical bottom chambers 22 of the heat-resistant bottom baking pan 20 is equal to the plurality of recessed cylindrical top chambers 28 of the heat-resistant top baking pan 26. The plurality of recessed cylindrical bottom chambers 22 of the heat-resistant bottom baking pan 20 is optionally twelve. The heat-resistant top baking pan 26 is removably disposed atop the heat-resistant bottom baking pan 20 so that one of the plurality of recessed cylindrical top chambers 28 of the heat-resistant top baking pan 26 is disposed atop one of the plurality of recessed cylindrical bottom chambers 22 of the heat-resistant bottom baking pan 20.

Figure 6:
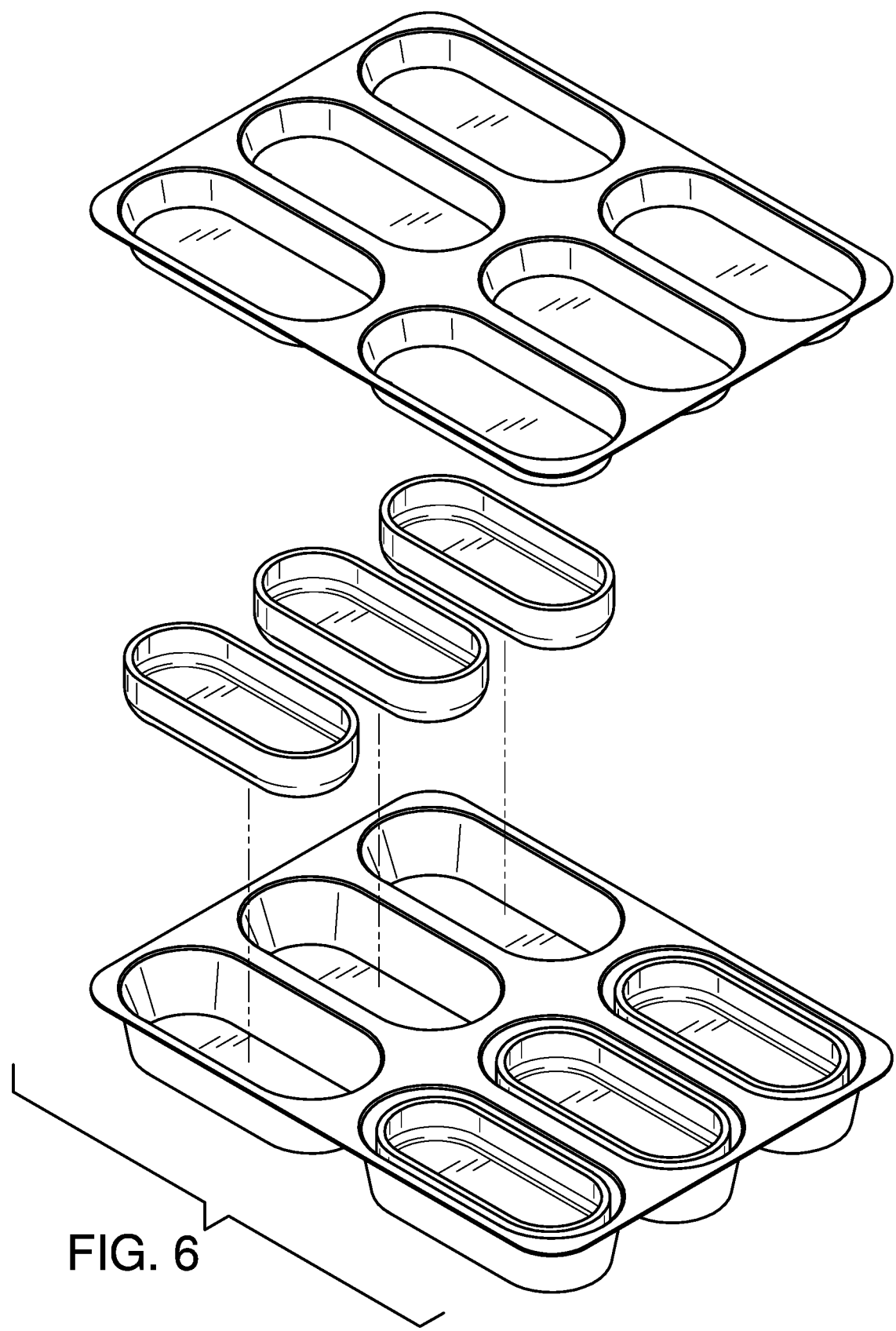
FIG. 6 is an exploded view.

It is envisioned that the kit for baking sandwich buns 10 can also be structured in the shape of a hot dog bun, too, as best shown in FIG. 6.

What is claimed is:
1. A kit for baking sandwich buns comprising:
   a heat-resistant bottom baking pan having a plurality of recessed cylindrical bottom chambers;
   a plurality of cylindrical bowls, each cylindrical bowl being structurally separate from each other cylindrical bowl wherein each cylindrical bowl is individually positionable, each of the plurality of cylindrical bowls having a circumference less than a circumference of each of the plurality of recessed cylindrical bottom chambers of the heat-resistant bottom baking pan, wherein one of the plurality of cylindrical bowls is removably disposable within one of the plurality of recessed cylindrical bottom chambers of the heat-resistant bottom baking pan; and a heat-resistant top baking pan having a plurality of recessed cylindrical top chambers, wherein a circumference of each of the plurality of recessed cylindrical top chambers is approximately equal to the circumference of each of the plurality of recessed cylindrical bottom chambers of the heat-resistant bottom baking pan;

wherein the plurality of recessed cylindrical bottom chambers of the heat-resistant bottom baking pan is equal in number to the plurality of recessed cylindrical top chambers of the heat-resistant top baking pan;

wherein the heat-resistant top baking pan is removably disposed atop the heat-resistant bottom baking pan such that one of the plurality of recessed cylindrical top chambers of the heat-resistant top baking pan is disposed atop one of the plurality of recessed cylindrical bottom chambers of the heat-resistant bottom baking pan.

2. The kit for baking sandwich buns of claim 1 wherein the plurality of recessed cylindrical bottom chambers of the heat-resistant bottom baking pan is twelve.

3. The kit for baking sandwich buns of claim 2 wherein each of the heat-resistant bottom baking pan and the heat-resistant top baking pan is metal.

* * * * *